United States Patent [19]

Inaba et al.

[11] 3,907,889

[45] Sept. 23, 1975

[54] CHELOCARDIN DERIVATIVES

[75] Inventors: Makoto Inaba; Edith Bernstein; David Lyon Garmaise, all of Montreal, Canada

[73] Assignee: Abbott Laboratories, North Chicago, Ill.

[22] Filed: June 18, 1973

[21] Appl. No.: 371,103

[52] U.S. Cl. ...... 260/559; 260/453 AP; 260/501.14; 260/501.18; 260/501.19; 260/554; 260/562 H; 260/564 RF
[51] Int. Cl.² ........................................ C07C 103/19
[58] Field of Search ......... 260/559 AT, 554, 562 H, 260/564 RF

[56] References Cited

FOREIGN PATENTS OR APPLICATIONS 1,238,471  4/1967  Germany

Primary Examiner—C. Davis
Attorney, Agent, or Firm—Paul D. Burgauer; Robert L. Niblack

[57] ABSTRACT

A number of specific hydrazone derivatives of chelocardin having high antibiotic activity are described. These new derivatives show unusually low toxicity and consequently, a very high therapeutic index as chemotherapeutic agents against gram-negative organisms.

6 Claims, No Drawings

CHELOCARDIN DERIVATIVES

DETAILED DESCRIPTION OF THE INVENTION

Chelocardin is the name assigned to the antibiotic M-319 originally described in U.S. Pat. No. 3,155,582 issued in 1964. The original publication did not disclose the chemical structure, but since then, the structure has been elucidated (see J.A.C.S., 92, page 6070 of 1970) and as a result of this knowledge, new derivatives were prepared. Unfortunately, predicting physiological activity of such new derivatives is impossible but, surprisingly, a new group of compounds has been found that share and even exceed the chemotherapeutic activity of chelocardin itself while showing some advantageous physical and/or chemical properties.

The new compounds which are the subject of the present invention are the acyl and substituted acylhydrazones, the guanylhydrazone, the semicarbazone and thiosemicarbazone of chelocardin, having the following general structure:

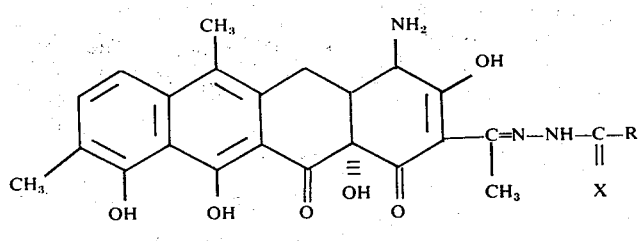

(I)

with R representing loweralkyl, benzyl, phenyl, hydroxyphenyl, pyridyl, amino, cyanoloweralkyl, aminophenyl, methoxyphenyl, furyl and X represents oxygen, sulfur or imino and pharmaceutically acceptable acid addition salts thereof.

The new compounds can easily be prepared by reacting chelocardin with a slight excess of a molar equivalent of the desired compound of the formula:

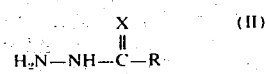

(II)

wherein R has the above meaning, in an inert, organic solvent or an aqueous mixture therewith. The term "inert" is used herein to express that the solvent does not react or interfere with any of the starting materials or the formed end product. A preferred reaction medium is aqueous tetrahydrofuran (hereinafter simply referred to as THF); however, excellent results are also obtained when the reaction medium is methanol, ethanol or the like. Usually, it is preferred to react a suitable salt of chelocardin with the desired compound of formula II, e.g., the desired hydrazide or hydrazide-related compound.

In a preferred embodiment, a nontoxic acid addition salt of chelocardin or chelocardin itself is combined with the compound of formula II in an inert, organic solvent and the solution is allowed to stand for at least 30 minutes at room temperature. Reaction times beyond 24 hours usually add no further benefit and in many instances, the condensation is essentially complete in 1 - 2 hours. If desired, the temperature of the reaction medium may be raised but since room temperature is usually adequate, no need exists to heat the mixture beyond 70° C. As a suitable reaction solvent, methanol, THF, and aqueous mixtures thereof are preferred. If chelocardin base is the starting material, the condensation product of formula I is obtained; if the starting material is an acid addition salt, the final product is the corresponding acid addition of the compound of formula I. In either case, the base can easily be converted to the desired salt and the salt can be converted to the base in routine and known fashion.

In order to illustrate the manner of preparing the new compounds, reference is made to the following examples which, however, are not intended to limit the invention in any respect. In all instances, the thin layer chromatography and spectrographic data obtained were in agreement with the assigned structures. Since the new substituent is attached in the 2a-position in all the derivatives described below, this location is not specifically indicated in these examples except by the showing of its location in formula I.

EXAMPLE 1

A solution of 0.83 g. of acethydrazide in 5 ml. of water is added to 2.5 g. of chelocardin hydrochloride in 100 ml. of 98% aqueous THF. The solution is decanted off a small quantity of solid impurity and allowed to stand for 1 hour at room temperature. The condensation product crystallizes out of the solution in a yield of 2.02 g. (71% of theory); recrystallization from 90% aqueous ethanol produces the pure chelocardin acethydrazone hydrochloride melting at 255° – 265° C.

EXAMPLE 2

Equimolar amounts (5.0 mM) of propionylhydrazide and chelocardin hydrochloride are stirred in 70 ml. of methanol for 1 hour at room temperature. The clear solution is concentrated in vacuo to a volume of 15 ml. and cooled. The crystalline chelocardin propionylhydrazone hydrochloride separates out in a yield of 2.04 g.; it melts at 235° – 238° C. with decomposition.

EXAMPLE 3

Equimolar amounts of chelocardin hydrochloride and phenylacethydrazide are combined in tetrahydrofuran (175 ml. per mM). After standing for 1 hour, the solvent is evaporated and the residue is recrystallized from ethanol, yielding 83% of chelocardin phenylacetylhydrazone hydrochloride. An analytically pure sample melts at 222° – 225° C.

EXAMPLE 4

To a solution of 3 g. of chelocardin in 120 ml. of methanol is added 1.07 g. of 4-aminobenzoylhydrazide. The mixture is stirred for 24 hours at room temperature, filtered and the filtrate is concentrated to 25 ml. The precipitated product is filtered, washed with ether and dried to produce a 51% yield (2.0 g.) of chelocardin-4-aminobenzoylhydrazone hydrochloride.

EXAMPLE 5

A solution of 1.17 g. of 4-methoxybenzoylhydrazide in 60 ml. of methanol is added dropwise to a clear solution of 3 g. of chelocardin hydrochloride in 120 ml. of methanol. The mixture is then stirred for 15 minutes, filtered and the filtrate is concentrated to 5 ml. By adding 60 ml. of water, chelocardin 4-methoxybenzoylhydrazone hydrochloride precipitates in a yield of 2.55 g. (64%).

EXAMPLE 6

The process of Example 5 is repeated with benzoylhydrazide replacing the hydrazide used before. The solution is filtered through a small bed of charcoal before concentrating it. Yield: 2.1 g. (93%) of chelocardin benzoylhydrazone hydrochloride; MP: 239° – 241° C. (dec.).

EXAMPLE 7

Chelocardin hydrochloride (2.24 g.) is added in small portions to a hot solution of 0.8 g. of 4-hydroxybenzoylhydrazide in 250 ml. of methanol containing 2 ml. of formic acid. After standing 30 minutes at room temperature, the mixture is filtered through 2 g. of charcoal and the filtrate is concentrated to 50 ml. in vacuo. By adding 100 ml. of ether, 2.64 g. of chelocardin 4-hydroxybenzoylhydrazone hydrochloride melting at 239° – 242° C. (dec.) is obtained.

EXAMPLE 8

A solution of 0.8 g. of salicylhydrazide in 100 ml. of methanol is rapidly added to a stirred solution of 2.24 g. of chelocardin hydrochloride in 120 ml. of methanol. The mixture is stirred 4 hours at room temperature, brought to near boiling and filtered through 2 g. of charcoal. The filtrate is diluted with 100 ml. of ethanol and the solution is concentrated to 100 ml. The precipitate formed is discarded; the solution is diluted with 300 ml. of ether which produces, upon standing, 1.81 g. of prisms identified as chelocardin 2-hydroxybenzoylhydrazone hydrochloride melting at 237° – 241° C. (dec.).

EXAMPLE 9

A solution of 4.12 g. of semicarbazide hydrochloride in 40 ml. of water is added to a stirred solution of 15.72 g. of chelocardin hydrochloride in 250 ml. of methanol. After standing for 2 hours, the solution is filtered to yield 11.1 g. (60%) of chelocardin semicarbazone hydrochloride.

EXAMPLE 10

To a solution of 0.89 g. of chelocardin hydrochloride in 15 ml. of methanol is added 0.19 g. of thiosemicarbazide. The solution is refluxed for 5 minutes, allowed to stand for 2 hours at room temperature and diluted with ether to precipitate 0.92 g. (88%) of chelocardin thiosemicarbazone hydrochloride.

EXAMPLE 11

By replacing the thiosemicarbazide of Example 10 with 0.29 g. of nicotinylhydrazide, the procedure of Example 10 produces 81% yield of chelocardin nicotinylhydrazone hydrochloride, melting at 234° – 236° C. (dec.).

EXAMPLE 12

A mixture of 0.895 g. of chelocardin hydrochloride and 0.36 g. of isonicotinylhydrazide in 5 ml. of water and 170 ml. of methanol is refluxed for 4 hours. The insoluble material is filtered off and the filtrate is concentrated to 15 ml. which produces 0.913 g. of chelocardin isonicotinylhydrazone hydrochloride melting at 235° – 240° C. (dec.).

EXAMPLE 13

In a mixture of 25 ml. of formic acid and 25 ml. of THF, 1.64 g. of chelocardin and 0.396 g. of cyanoacethydrazide are allowed to stand for 4 hours. By adding ether in portions of 50 ml., 100 ml. and 150 ml., three fractions of precipitates are obtained. The middle fraction represents the desired chelocardin cyanoacethydrazone. Yield: 1.56 g. (79%); MP: 227° – 231° C. (dec.).

EXAMPLE 14

A solution of 631 mg. of furoylhydrazide in 10 ml. of methanol is combined with 2.238 g. of chelocardin hydrochloride in 160 ml. of methanol. After stirring for 5 minutes, the mixture is allowed to stand for 45 minutes and is then concentrated to a viscous solution which is diluted with ether, yielding 2.6 g. (93%) of chelocardin 2-furoylhydrazone hydrochloride; melting at 235° – 237° C. (dec.).

EXAMPLE 15

To a solution of 1 g. of chelocardin in 40 ml. of methanol is added 260 mg. aminoguanidine hydrochloride. After standing for 16 hours at room temperature, the solution is filtered and the filtrate concentrated to 5 ml. After diluting this concentrate with 35 ml. of ethanol, the volume is reduced to 25 ml. and the amorphous residue is collected and combined with a second crop of material obtained after addition of ether. Yield: 940 mg. (78%) of chelocardin guanylhydrazone dihydrochloride monohydrate.

EXAMPLE 16

To a solution of 1.792 g. of chelocardin hydrochloride in 200 ml. of methanol, a suspension of 2.343 g. of n-propylsemicarbazide in 10 ml. of 2 N hydrochloric acid is added. The mixture is stirred at room temperature for 18 hours and filtered to remove insoluble solids. The filtrate is evaporated to about 30 ml. and 1.841 g. (85%) of chelocardin-n-propylsemicarbazone hydrochloride melting at 230° – 234° C. (dec.) is obtained.

EXAMPLE 17

To a suspension of 1.777 g. of methylsemicarbazone and 2.0 g. of chelocardin hydrochloride in 200 ml. of methanol, 10 ml. of 2 N hydrochloride is added and the mixture is heated under reflux for 27 hours and then cooled in an ice bath and filtered. The filtrate is evaporated to about 20 ml. in 4 steps and the solids produced are filtered after each evaporation step. The first crop of 761 mg. and second crop of 785 mg. are identical as established by IR-spectroscopic determination and melting point. A total yield of 1.456 g. (66.5%) of chelocardin-methylsemicarbazone hydrochloride melting at 238° – 240° C. (dec.) is obtained.

EXAMPLE 18

To a solution of 1.792 g. of chelocardin hydrochloride in 200 ml. of methanol, a suspension of 2.243 g. of allylsemicarbazide in 10 ml. of 2 N hydrochloric acid is added. The mixture is stirred at room temperature for 24 hours and subsequently filtered to remove the insoluble solids. The filtrate is evaporated to dryness to yield 1.731 g. (79.4%) of chelocardin-allylsemicarbazone hydrochloride melting at 230° – 235° C. (dec.)

EXAMPLE 19

To a mixture of 1.788 g. of chelocardin hydrochloride and 3.712 g. of o-chlorophenylsemicarbazide in 200 ml. of methanol, 10 ml. of 2 N hydrochloric acid is added and the mixture is stirred at room temperature for 4 days. The mixture is then filtered and the filtrate is evaporated stepwise. The first and second crop, 717 and 548 mg., respectively, are identical as established by their IR-spectra and melting point. A total yield of 1.265 g. (51.4%) of chelocardin-o-chlorophenyl-semicarbazone hydrochloride melting at 233° – 237° C. (dec.) is obtained.

EXAMPLE 20

In order to show the antibiotic and bacteriostatic activity of the compounds of the present invention, the minimum inhibitory concentrations (MIC) are demonstrated in Table 1 below. The bacteria are first grown in a brain-heart infusion broth for 24 hours at the optimum temperature for the organism. The culture is then diluted with water so that there are about 10 Mio. viable organisms per milliliter. The cell suspension is used as the inoculum for the tests reported below. The test compounds, about 20 mg. of each, are dissolved in 0.2 ml. of methanol and 19.8 ml. of water. The various test solutions of varying concentrations are well distributed in agar suspensions adjusted to a pH of 7.4 and placed in Petri dishes so that each dish contains a known amount of test compound.

The surfaces of the solidified agar plates are then inoculated with the test culture by streaking the test culture on the surface of the plate with a standardized loop that has been dipped in the inoculum and incubated at room temperature for 24 hours. The MIC values in Table 1 are expressed in mcg./ml.

As shown in Table 1, the compounds of the present invention exhibit valuable bacteriostatic properties and are consequently useful in pharmaceutical compositions. The compounds of this invention also exhibit very low oral and subcutaneous toxicities and produce essentially the same antibiotic activities in vivo as chelocardin. Thus, the compounds of Examples 1, 13 and 15 show an oral $CD_{50}$ (CD = mean curative dose) of below 200 mg./kg. and most other compounds shown above have $CD_{50}$ values below 400 mg./kg. as determined by the mouse protection test. The same test shows subcutaneous $CD_{50}$ values of 25 – 50 mg./kg. while these values for the compounds of Examples 3, 9 and 15 have a $CD_{50}$ value of 12.5 – 25 mg./kg.; other compounds of this invention show subcutaneous $CD_{50}$ values of around 100 mg./kg.

In addition to the excellent bacteriostatic properties of the new compounds, they also show a surprising physical characteristic: they are more soluble in water than chelocardin itself; some of the new compounds, in fact, show extremely high water solubilities. In this respect, the new compounds distinguish favorably over chelocardin itself. This excellent solubility makes the new compounds particularly suitable for parenteral solutions which can easily be prepared by simply dissolving the new chelocardin derivatives in water which may be buffered to a pH of 7.0 – 7.8 and may contain 0.5 – 5% by weight of a preservative such as benzyl alcohol.

Preferably, the new derivatives are used in the form of their acid addition salts with pharmaceutically acceptable acids, i.e., hydrochloric, sulfuric, acetic, phosphoric, tartaric, citric or succinic acid. Since hydrochloric acid forms stable acid addition salts with the new compounds and such salts are suitable for pharmaceutical preparations and can be made easily, they are preferred.

For oral dosage forms, tablets, pills, wafers, suspensions, syrups, etc. can be prepared in standard fashion,

TABLE 1

| Compd. of Ex. | Staph. Aureus 45 | Staph. Aureus Smith | S. Pyogenes C-203 | Enterococcus 89 | Escher. Coli Juhl | Kleb. Pneum. 8045 | Past. Mult. 10544 | Prot. Vulg. ABB JJ | Prot. Mira. Fin. 9 | Salm. Typhi. Ed. 9 |
|---|---|---|---|---|---|---|---|---|---|---|
| 1 | 12.5 | 12.5 | 6.2 | 12.5 | 12.5 | 6.2 | 0.78 | 6.2 | 6.2 | 6.2 |
| 2 | 50 | 50 | 25 | 50 | 50 | 12.5 | 1.56 | 12.5 | 12.5 | 12.5 |
| 3 | 25 | 25 | 12.5 | 50 | 50 | 6.2 | 6.2 | 12.5 | 12.5 | 12.5 |
| 4 | 50 | 50 | 25 | 50 | 50 | 12.5 | 1.56 | 12.5 | 12.5 | 12.5 |
| 5 | 100 | 100 | 50 | >100 | 100 | 50 | 3.1 | 25 | 25 | 25 |
| 6 | 100 | 100 | 25 | 100 | 100 | 25 | 3.1 | 25 | 25 | 25 |
| 7 | 50 | 50 | 50 | 100 | 50 | 25 | 3.1 | 12.5 | 12.5 | 25 |
| 8 | >100 | >100 | >100 | >100 | >100 | >100 | 25 | >100 | >100 | >100 |
| 9 | 25 | 25 | 25 | 50 | 25 | 12.5 | 1.56 | 12.5 | 25 | 6.2 |
| 10 | 50 | 50 | 25 | 100 | 100 | 25 | 3.1 | 50 | 50 | 25 |
| 11 | >100 | >100 | 100 | >100 | 100 | 100 | 12.5 | >100 | >100 | 100 |
| 12 | 50 | 50 | 12.5 | 50 | 50 | 12.5 | 6.2 | 12.5 | 12.5 | 12.5 |
| 13 | 50 | 50 | 50 | 50 | 50 | 12.5 | 1.56 | 12.5 | 12.5 | 12.5 |
| 14 | >100 | >100 | 50 | >100 | >100 | 50 | 3.1 | 50 | 50 | 50 |
| 15 | 50 | 50 | 25 | 50 | 25 | 12.5 | 3.1 | 12.5 | 12.5 | 25 |
| 16 | 25 | 25 | 12.5 | 50 | 25 | 6.2 | 0.78 | 6.2 | 6.2 | 6.2 |
| 17 | 50 | 25 | 25 | 50 | 50 | 12.5 | 3.1 | 25 | 50 | 25 |
| 18 | 25 | 25 | 12.5 | 50 | 25 | 6.2 | 0.78 | 12.5 | 6.2 | 12.5 |
| 19 | 100 | 50 | 25 | 100 | 100 | 50 | 6.2 | 50 | 50 | 50 | using the usual pharmaceutically acceptable excipients such as carriers, diluents, pigments, dyes and coatings. The coatings for tablets may be of the kind that dissolves rapidly in the acidic environment of the stomach, or a sustained-release coating formulation may be selected to provide a gradual release of the active ingredient over an extended period of time in order to maintain a bacteriostatic blood level over periods ranging from 2 – 24 hours.

For the treatment of smaller animals, a daily dose of 10 – 200 mg./kg. is recommended for oral administration. For larger animals, including humans, a daily oral dose of 50 – 800 mg. produces the desired antibiotic activity. Oral dosages are preferably prepared in unit dosage form with the dosage selected in such amounts that a single or several doses are administered over a 24-hour period.

What is claimed is:

1. A compound of the formula:

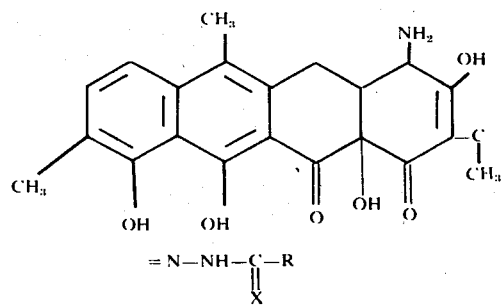

with R representing loweralkyl, cyanoloweralkyl, phenyl, benzyl, hydroxyphenyl, aminophenyl, or methoxyphenyl, and X represents =O, =S or =NH, or a pharmaceutically acceptable acid addition salt thereof.

2. The compound of claim 1 wherein R is methyl and X is O.

3. The compound of claim 1 wherein R is benzyl and X is O.

4. A compound as defined in claim 1 wherein X is oxygen.

5. The process of making a compound of the formula:

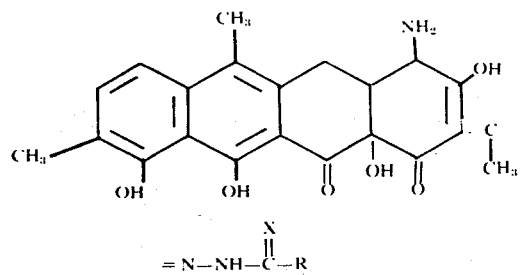

wherein R is loweralkyl, phenyl, hydroxyphenyl, methoxyphenyl, aminophenyl, or benzyl, cyanoloweralkyl, and X is O, S or NH or a nontoxic acid addition salt thereof, consisting essentially in combining chelocardin or a nontoxic acid addition salt thereof with a compound of the formula:

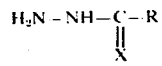

wherein X and R have the above meaning, in the presence of an inert, organic solvent, allowing the two reactants to co-react with one another for a period of 30 minutes to 24 hours at a temperature between room temperature and 70° C., and recovering said compound of formula 1 or the acid addition salt of said compound from said solvent in the usual manner.

6. The process of claim 5 for making a compound of formula I wherein X is oxygen.

* * * * *